June 6, 1967 V. BROWN 3,323,896
COMPOSTING METHOD
Filed Oct. 18, 1965
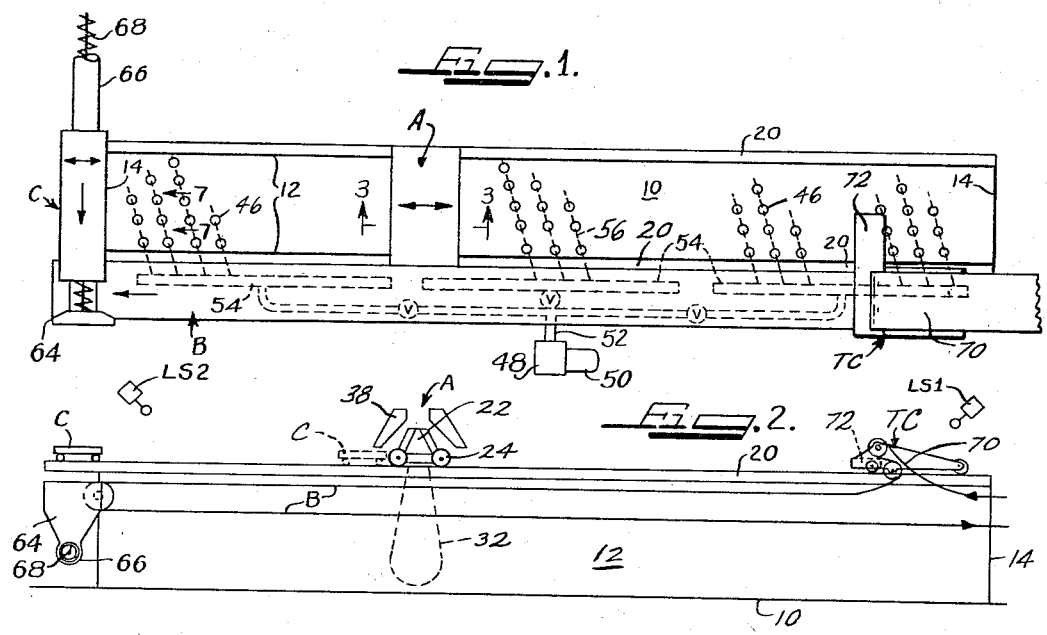
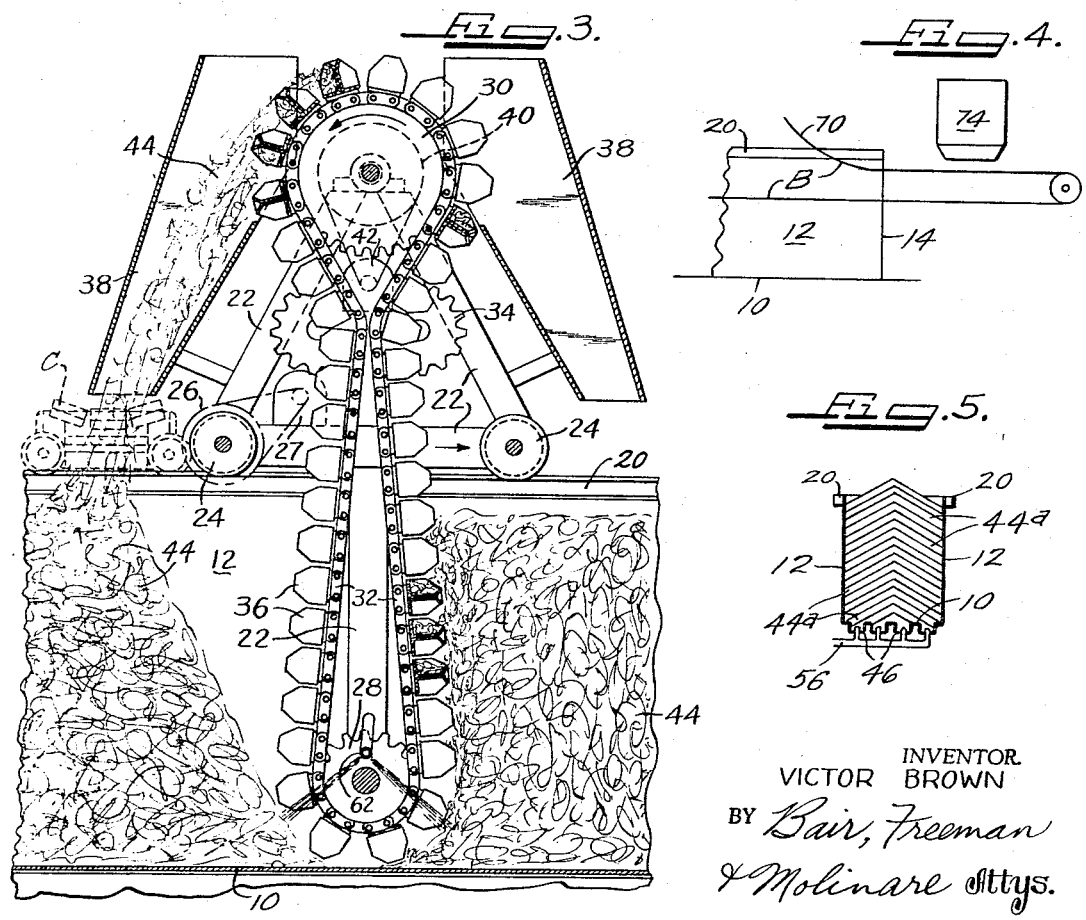
INVENTOR.
VICTOR BROWN
BY Bair, Freeman
& Molinare Attys.

3,323,896
COMPOSTING METHOD
Victor Brown, Elmhurst, Ill., assignor to New Life Foundation, Wheaton, Ill., a corporation of Illinois
Filed Oct. 18, 1965, Ser. No. 497,035
2 Claims. (Cl. 71—9)

This application is a continuation-in-part of co-pending application S.N. 357,423 filed Apr. 6, 1964.

This invention relates to a composting method, and particularly to one which produces complete aerobic digestion of waste organic material, such as garbage, performed in an apparatus of batch-type which is capable of operation through the entire range of mesophilic and thermophilic digestion as well as cooling-out and partial drying as shown and claimed in my copending application, Ser. No. 357,423, filed Apr. 6, 1964, the present application being a continuation-in-part thereof.

One object of the present invention is to provide a method for composting waste organic material and obtaining therefrom an organic fertilizer of guaranteed uniform analysis which comprises first distributing a mass of heterogeneous ground waste material in layers in a tank, lifting the material from the end of the layers to a point above the surface of the mass and dropping it back into the tank to convert the heterogeneous layered mass to a homogeneous non-layered mass while exposing it to air, chemically analyzing the batch and adding chemicals as required, either in solution by spraying or fogging, or by broadcasting if dry chemicals are used, to produce a fertilizer product of desirable and uniform analysis.

Still another object is to add chemicals as required to secure a desired chemical content after analyzing the batch and using the apparatus to accomplish even distribution of the chemicals throughout the batch.

A further object is to provide a method which utilizes the movement of an agitator back and forth along a tank containing a heterogeneous layered mass of waste material, to convert the mass to fertilizer of guaranteed analysis, the apparatus first utilizing a feeder for filling the tank and which produces uniform layers of differing composition throughout the tank then tumbling and mixing by moving the agitator a number of passes throughout the length of the tank, then distributing additional chemical to the mass and again utilizing the agitator to tumble the mass and chemicals to evenly distribute the one relative to the other.

With these and other objects in view, my invention consists in the steps of my herein disclosed composting method, whereby the objects above contemplated are attained, as hereinafter more fully set forth, pointed out in my claims and illustrated in detail on the accompanying drawing, wherein:

FIG. 1 is a diagrammatic plan view of a composting apparatus suitable for practicing my composting method;

FIG. 2 is a diagrammatic side elevation thereof;

FIG. 3 is a vertical detailed sectional view taken on the line 3—3 of FIG. 1;

FIG. 4 is a continuation of the right-hand end of FIG. 3, and

FIG. 5 is a diagrammatic lateral cross section through the apparatus.

On the accompanying drawing I have used the reference numeral 10 to indicate the bottom of an elongated tank, 12 the sides thereof and 14 the ends thereof. The tank 10, 12, 14 may be formed of sheet metal, concrete or other suitable material in a size such as 12′ wide and 120′ long. The size, of course, may be varied to suit the requirements of my method. Details of the tank are shown in my parent application above referred to.

Along the sides 12 of the tank I provide a pair of rails 20. An agitator A and a conveyor C are adapted to travel along the rails 20. The agitator A comprises a suitable frame 22 which is supported by wheels 24 on the rails 20. In FIG. 3 a sprocket 26 is shown which may be driven from a motor 27 for propelling the agitator A.

The frame 22 is provided with lower sprockets 28 and upper sprockets 30 adjacent each side 12 of the tank, and sprocket chains 32 extend therearound and around idler sprockets 34. The chains 32 carry elevator buckets 36 which have ends that terminate relatively close to the walls 12 so that the buckets substantially span the tank laterally for elevating the organic material 44 therein as will hereinafter appear. Such material has been previously reduced to small particle size as by a grinder or hammer mill 74 shown in FIG. 4 and water mixed with it to the proportion of 60% or so to form a slurry-like mass.

The agitator A also has a pair of chutes 38, and the entire agitator as well as its buckets 36 are symmetrical for operation in either direction. The elevator chains 32 and their buckets 36 operate upwardly in a gap of the material 44 as illustrated in FIG. 3 and may be driven by a sprocket 40 and motor 42. Both motors 27 and 42 are provided with suitable step-down gearing as the speed of rotation for the sprockets 26 and 42 is necessarily much lower than the rotation of the motor shaft. The step-down gearing also preferably includes a suitable means for changing the speed of rotation of the output shaft to meet varying requirements.

The agitator A is adapted to travel toward the right as shown in FIG. 3 at which time the sprockets 30 travel counterclockwise thus elevating the buckets 36 on the right or front side lowering them on the left or back side. As the buckets speed up slightly in traveling over the top of the sprocket 30 they throw their contents into the left-hand chute 38 whereby it is fed back into the tank as illustrated. Similarly, when the agitator travels toward the left, the sprockets 30 will rotate clockwise and pick up material on the left side which is now the front side and discharge it through the right-hand chute 38 behind the agitator.

The agitator is operated to traverse the tank in one direction, and when it arrives at one end of the tank, it and the rotation of the sprocket 40 are reversed so as to travel in the opposite direction. It is again reversed at the end of such travel thereby traveling back and forth throughout the length of the tank in a continuous manner. The organic material 44 is thus progressively agitated and elevated for evenly distributing the bacteria and periodically aerating each portion of the material during the digesting process.

In this connection it may be mentioned that there are two phases of digestion, a first phase of mesophilic digestion in the range of about 110° F. for a twenty-four hour period, then thermophilic digestion at about 140° F. for a period of approximately 165° F. for a forty-eight hour period. After that, cooling out and partial drying may be accomplished in the apparatus disclosed or the hot material may be removed for cooling out and drying elsewhere if desired.

In a tank and agitator apparatus of the kind described, the digesting process is helped by the introduction of air at the bottom of the tank, the temperature of which may be controlled as desired. Also the addition of water particularly at the gap in the material produced by the agitator as illustrated in FIG. 3 is advantageous.

For the purpose of introducing air a plurality of pots 46 as shown in FIG. 1 in the bottom 10 of the tank and a blower 48 for supplying air thereto are shown. The blower 48 is driven by a motor 50 and has an airline 52 extending to manifolds 54 from which branch pipes 56 extend to a nozzle 58 in each pot 46. The nozzles may be merely pipe caps, each drilled with a small opening one-eighth inch or so in diameter and the pots may be filled with gravel to diffuse the air discharged from the nozzles as shown in detail in my parent application.

As shown in FIG. 3 the agitator frame 22 carries a water pipe 62 having openings for spraying water against the adjacent wall of organic material 44 as it is elevated from the tank and returned thereto.

After the digesting period, and the cooling out and drying period if practiced in the tank, the digested material 44 may be removed therefrom by positioning the conveyor C as shown in dotted lines in FIGS. 2 and 3 and attaching it to the frame 22 for travel therewith so that as the agitator traverses the tank from left to right the conveyor C will receive the material and discharge it on a conveyor B shown in FIG. 1 adjacent the near side 12 of the tank. The conveyor B may discharge into a hopper 64 of a take-away conveyor 66 which may be of the screw type, the screw being shown at 68.

In the operation of an apparatus of the kind disclosed, the various phases of aerobic digestion, etc., may be automatically programmed or manually controlled as desired. In either event it is desirable to have limit switches such as LS1 and LS2 in FIG. 2 to automatically reverse the travel of the agitator A and the bucket elevator carried thereby for back and forth operation of the agitator in a continuous manner.

During the mesophilic phase of digestion, the temperature of the air discharged from the pots 46 may be regulated (thermostatically if desired) to maintain the 110° F. temperature within the mass of organic material 44. Likewise the thermophilic and sterilizing phases may be regulated as to the respective temperatures of 140° F. and 165 °F. Then if a cooling out and partial drying period is desired, the temperature of the air can be reduced as desired and thus the single tank and apparatus disclosed serve to completely process the organic material from undigested material with a proportion of bacteria mixed with it for initiating the digesting operation to completely digest it, and then sterilize the material to make it suitable as a soil conditioner after it has been further dried.

The foregoing described apparatus efficiently agitates a batch of organic material throughout the various phases of digestion, sterilization and cooling out. The agitator is so designed that in cooperation with the conveyor C the material may be removed from the tank after the processing has been completed. The next batch of material may be brought in from the grinder 74 on the conveyor belt B from which it may be removed by a suitable tripper conveyor TC having an elevating section 70 for a portion of the conveyor belt B and a conveyor section 72 to receive the material from the conveyor belt and deposit it at substantially the center from side to side of the tank 10, 12, 14. The tripper conveyor is wheel-mounted for travel along the belt B so it also can travel back and forth throughout the length of the tank for depositing a batch of the organic material 44 in progressive multiple generally horizontal superposed layers as shown at 44a in FIG. 5, evenly distributed along the length of the tank. After deposit, the agitator A can be energized for operation on the new batch of material by lifting said material upwardly from the ends of said layers and dropping it back into the tank as it traverses the length of the tank.

Most of the foregoing described apparatus is claimed in my parent application. It may be used for practicing my herein claimed method to produce such uniformity on the heterogeneous layered mass of organic material 44a that a fertilizer of guaranteed-analysis can be taken from the tank. This is accomplished by:

(1) Sorting the heterogeneous garbage received at the composting plant so as to remove non-organic materials.

(2) Grinding the heterogeneous remaining organic materials (grinder 74 in FIG. 4) to reduce large particles to a suitable size (for Example 2" particles) for aerobic digestion.

(3) Filling the tank in such manner as to give a uniform distribution of the successive batches of differing composition, e.g., grass, paper, restaurant garbage, etc., by reason of filling the tank by the back and forth traversals of the tripper conveyor TC while the conveyor belt B is being operated to bring to the tripper the organic material after it has been ground. Uniform back and forth traversal of the tripping conveyor TC will gradually fill the tank as represented by the layers of differing composition 44a in FIG. 5 and this operation may take as much as a day or two to accomplish in a tank of the size referred to.

(4) Tumbling and mixing accomplished by the back and forth movements of the agitator A a number of times such as five to ten times per batch during each of the aerobic stages and the cooling out and partial drying stage above referred to.

(4A) Chemically analyzing the batch as by analyzing random samples at periodic stations along the tank. From such analyzation the analyst can determine the necessary quantities of chemical such as nitrogen, phosphate, potash, etc., that need to be added to the mass to bring it up to the desired chemical content suitable as a fertilizer for any desired type of ground.

(4B) Adding chemicals, broadcast by hand or otherwise if it is a powdered or granular type of chemical or spraying it into the tank if it is liquid in order to bring the organc material up to the required analysis for uniform product throughout the batch. The additional powdered or granular chemical may be added by supplying it on the belt B to the tripper conveyor TC if desired, or if in liquid form can be sprayed or fogged from the water pipe 62 or supplied to the nozzles 58 by introducing it into the line 52 and through the manifolds 54 in an obvious manner. Uniform distribution of the incoming mass of diverse materials and the maximum dispersion produced by using the apparatus as suggested give a uniform end product. At any time aerobic digestion is complete, bacterial action can be stopped by complete aeration to cool and dry the mass. This maximizes the nitrogen content since the bacteria continue to work on the mass of material and give off nitrogen needed to produce high food value in the fertilizer.

(4C) Cooling out and partial drying of the contents of the tank.

(5) Removal of the tank contents by operation of the agitator A, conveyor C, belt B and auger 68. The resulting fertilizer is then dried for a final moisture content of something less than 25%.

Some changes may be practiced in the steps of my composting method without departing from the real spirit and purpose of my invention, and it is my intention to cover by my claims any modification of such steps or use of mechanically equivalent steps which may reasonably be included within their scope.

I claim as my invention:

1. A method for converting successive batches of organic refuse material of differing composition to a compost of uniform composition which comprises grinding each batch in succession, distributing the ground material over the entire bottom of a tank in multiple, generally horizontal superposed layers, said layers being of differing composition depending upon the composition of refuse material in said batches, uniformly and progressively lifting said material upwardly from the ends of said layers to a point above the top layer in said tank and dropping it back into said tank to intermix said layers into a uniform non-layered mass, while exposing all of said material to air.

2. The method of claim 1 in which nitrogen phosphate or potash chemicals are uniformly supplied to the intermixed layers and said lifting step is repeated during the conversion process to distribute uniformly said chemicals throughout the compost product.

(References on following page)

References Cited

UNITED STATES PATENTS

| | | | |
|---|---|---|---|
| 2,285,834 | 6/1934 | Proctor | 71—9 |
| 2,878,112 | 3/1959 | Morrison | 71—9 |
| 2,947,619 | 8/1960 | Gorby | 71—9 |
| 3,114,622 | 12/1963 | Hardy | 71—9 |
| 3,188,280 | 6/1965 | Vilain | 195—27 X |

FOREIGN PATENTS

| | | |
|---|---|---|
| 521,894 | 6/1940 | Great Britain. |
| 521,939 | 6/1940 | Great Britain. |
| 929,870 | 6/1963 | Great Britain. |

DONALL H. SYLVESTER, *Primary Examiner.*

T. D. KILEY, *Assistant Examiner.*